Jan. 8, 1924.

E. L. BROOME 1,480,148

GAS PRODUCER

Original Filed April 14, 1917    3 Sheets-Sheet 2

Inventor
Ernest L. Broome

By his Attorney
Clarence D. Kerr

Jan. 8, 1924.
E. L. BROOME
1,480,148
GAS PRODUCER
Original Filed April 14, 1917    3 Sheets-Sheet 3
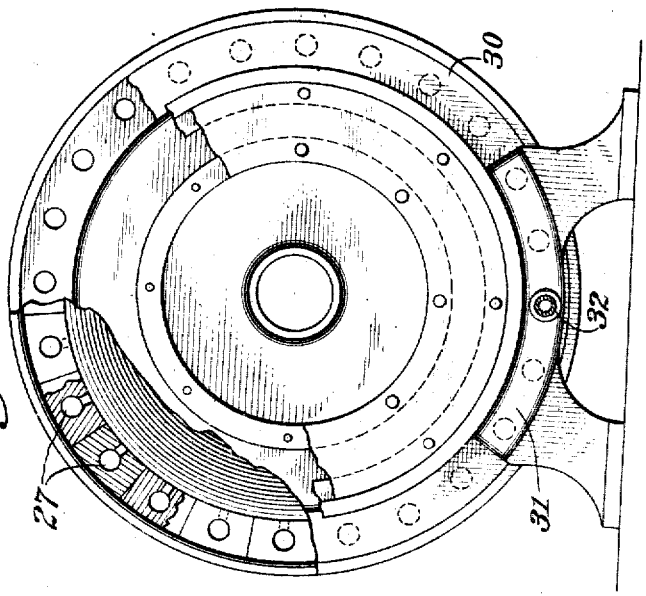
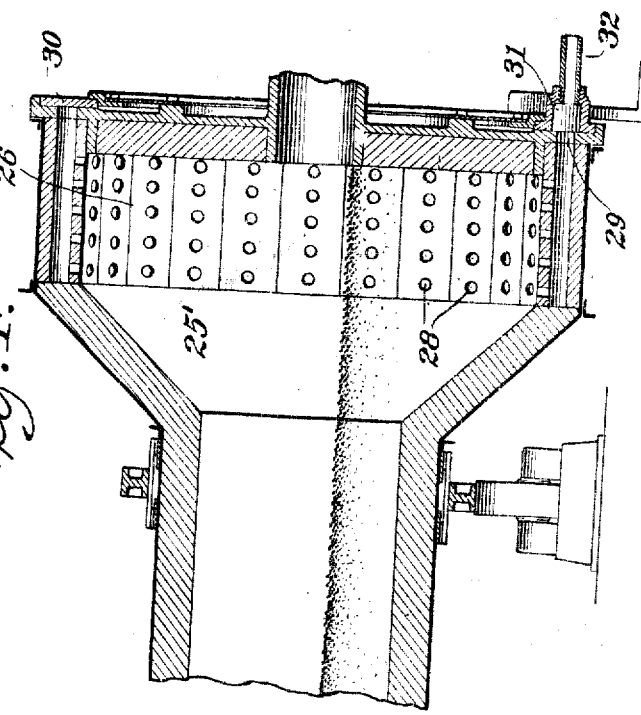
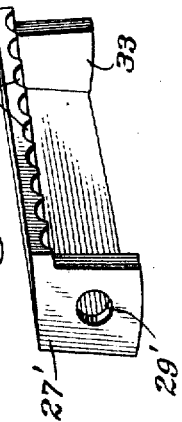
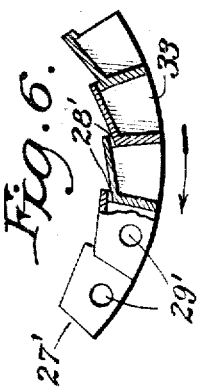

Patented Jan. 8, 1924.

1,480,148

UNITED STATES PATENT OFFICE.

ERNEST L. BROOME, OF TARRYTOWN, NEW YORK, ASSIGNOR TO GENERAL REDUCTION, GAS AND BY-PRODUCTS COMPANY, OF NEW YORK, N. Y., A CORPORATION OF DELAWARE.

GAS PRODUCER.

Application filed April 14, 1917, Serial No. 161,972. Renewed June 29, 1923.

*To all whom it may concern:*

Be it known that I, ERNEST L. BROOME, a citizen of the United States, and a resident of Tarrytown, Westchester County, New York, have invented new and useful Improvements in Gas Producers, of which the following is a specification, reference being had to the accompanying drawings, in which—

Figure 1:
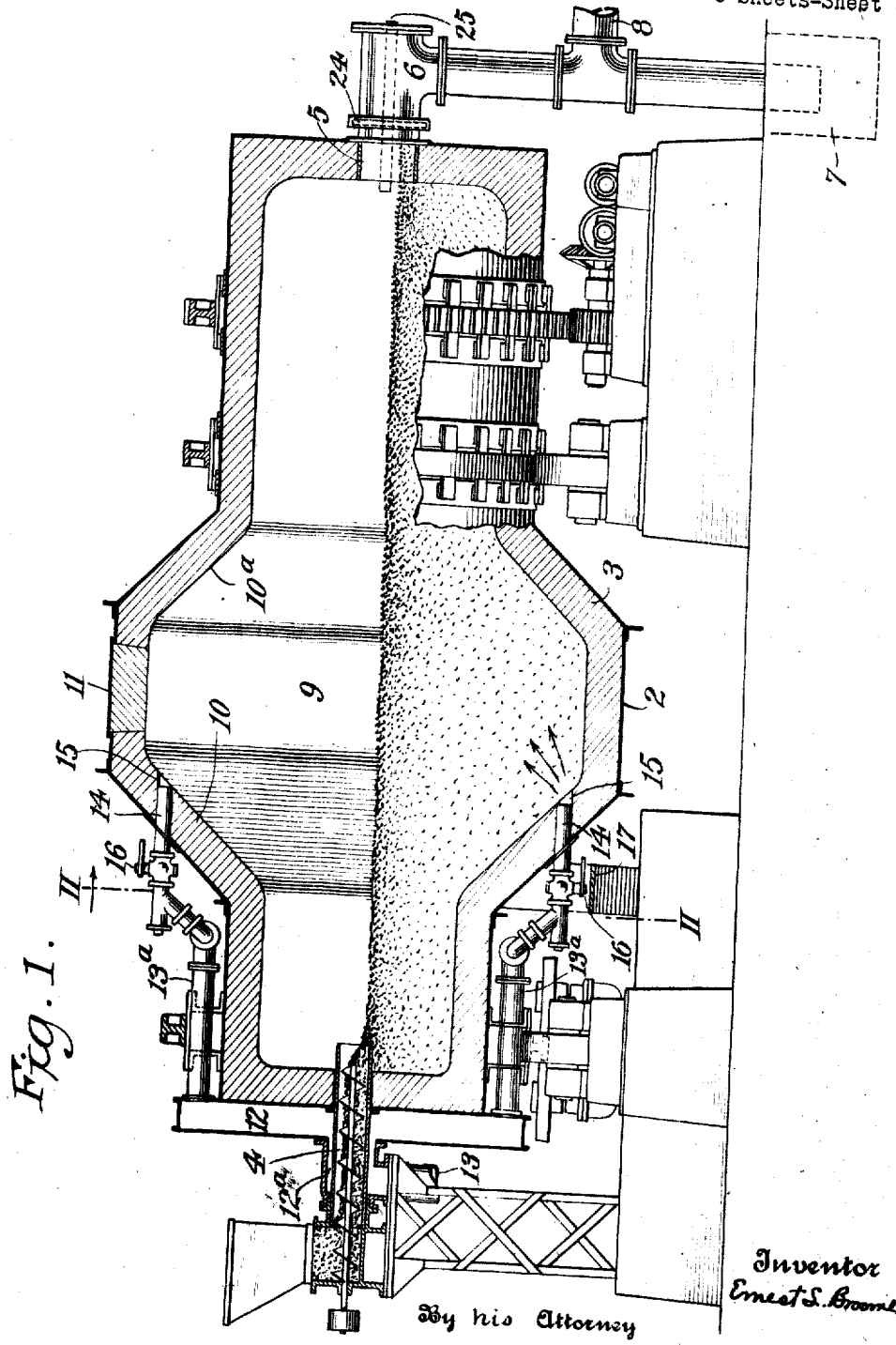
Figure 2:
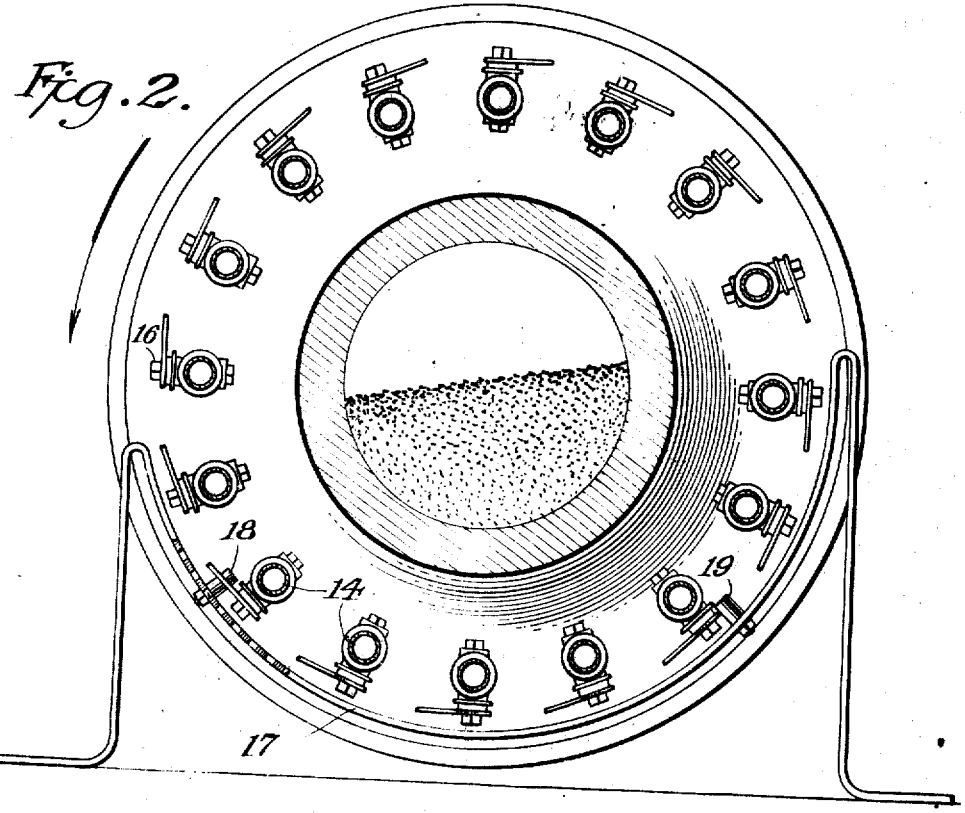
Figure 3:
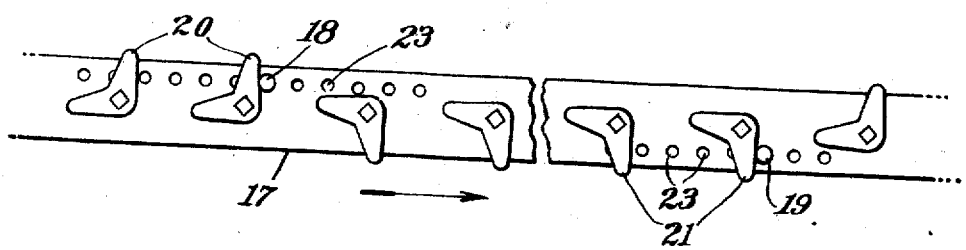

Figure 1 shows a section of a machine embodying my invention; Fig. 2 is a section on line II—II of Fig. 1; Fig. 3 is a detail of the valve opening and closing mechanism; Fig. 4 is a vertical section showing a modified form of my invention and Fig. 5 is an end elevation thereof, partly in section; Fig. 6 shows in section a modification of the grate shown in Figs. 4 and 5; and Fig. 7 is a perspective of one of the sections thereof.

My invention relates to producers which are capable of use in gasifying materials, and is comprised of apparatus and the method of using the same, which I shall hereinafter describe and claim.

Referring to the drawings, 2 is a metal shell or casing which is adapted to be rotated by any well known means, and has a refractory lining 3. At the feed-end of the casing is a screw conveyer 4, by which the material is admitted into the vessel, and at its discharge end it has a central aperture 5, through which the ash or waste material and the gas passes out and into the offtake 6. At the bottom of the offtake 6 is a waterseal 7, into which the ash settles while the gas passes off through the pipe 8. The central portion 9 of the cylinder is preferably of greater diameter than are the end portions, and is joined to the end portions by the inclined walls 10 and 10ª. In the central portion there is a door 11 of considerable size, so as to afford access to the interior of the cylinder and enable the removal of clinkers which sometimes form therein, and also to permit any necessary repairs to be made.

At the feed-end of the cylinder I have shown a chamber 12 for air or other oxygen bearing agent, having a central aperture 12ª, which registers with the end of the air supply pipe 13, and the air chamber in turn supplies air through piping 13ª to a plurality of nozzles of tuyères 14, which are preferably positioned in apertures 15 in the inclined wall 10 of the vessel, near the periphery of the central portion 9. Connected with each tuyère 14 is a valve 16, which it is desirable to have closed when the tuyères are above the fuel level, and open when below such level, so as to supply air or gas for combustion or gasification of the fuel, as the producer revolves. The mechanism for opening and closing the valves consists in a strap 17, mounted beneath the vessel, and which has an arcuate middle section having pins 18 and 19 positioned thereon on opposite sides of the line of travel of the valve. As the cylinder revolves the arm 20 of each valve strikes the pin 18, which rotates the valve to open position, thus admitting the elastic fluid into the vessel below the fuel level. Further rotation of the cylinder will bring the other arm 21 of the valve handle into contact with the pin 19, which rotates the valve to close it. As is indicated in Figs. 2 and 3, the pins 18 and 19 are positioned in apertures 22 in the strap 17, so that the length of time during which the elastic fluid is supplied for combustion may be varied as desired.

To permit expansion and contraction, and also to prevent the escape of gas between the fixed and movable parts, I have provided an expansion joint 24 between the discharge aperture 5 and the offtake 6.

In the production of producer gas in the apparatus just described, combustion is started in the interior of the producer, the necessary fuel preferably being inserted through the door 11. When the interior of the producer has become hot enough, fuel is fed through the screw conveyer 4 into the vessel, and the vessel is set in rotation. The areas or zones of greatest combustion or gasification are those immediately around each tuyère 14, and, as the vessel rotates, the fuel immediately in front of it rolls over and constantly shifts, so that the fuel which is brought into these zones of greatest combustion or gasification shifts and changes, so as to constantly bring new fuel into each of the zones of intense combustion or gasification. With light fuels, such as anthracite slush, buckwheat, sawdust, lignite, bituminous slack, and the like, the material is frequently so light that it blows away from immediately in front of each tuyère, so that a certain rate of travel is necessary with such material in order to keep the fuel massed about each successive tuyère, and in the zone of intense combustion thereabout. In this way the porosity of the mass is kept uniform, and the formation of "chimneys", blow holes, etc., which permit the ununiform escape of gas through the mass, is thereby obviated. This results in obtaining a very efficient combustion or gasification, and a very high return of gas.

As the discharge opening from the vessel is comparatively small, and arranged centrally, it permits the maintenance of a deep fuel bed, and it is not necessary to have a large discharge opening, owing to the fact that the ash from the materials mentioned constitutes a small proportion of the original mass.

The gas passes down through the offtake 6 and out through the pipe 8, while the ash settles in the waterseal 7.

My improved apparatus is also suitable for use in making water gas, and the process, as in the manufacture of producer gas, is continuous, the main difference being that first air and then steam are alternately blown from the tuyères through the mass; that is, air or gas is turned on to supply combustion, and when the mass has been sufficiently heated, steam is turned on, and the result is the production of water gas. That is, the fuel is alternately air blasted and steam blasted through the same tuyères. Oil or other hydrocarbon for enriching the water gas may be sprayed into the vessel through the nozzle 25.

In Figs. 4 and 5 I have shown a modification of apparatus which may be used in carrying out my invention, in which the vessel has an enlarged portion 25', on the periphery of which is a grate 26. The grate is comprised of hollow sections 27, each of which has apertures 28 on its inner face, and at its rear end a nozzle 29, open to the rear. Secured to the rear end of the vessel is an annular stationary plate 30, which, at its bottom portion, has an elastic fluid chamber 31, which has an open side bearing against the ends of the nozzles 29. The elastic fluid is supplied through a pipe 32.

When the producer is set in operation the elastic fluid for combustion is blown through the pipe 32, chamber 31, into the nozzles 29, into the sections 27, and from there through the grate apertures 28 into the vessel, thus generating an intense activity in the fuel bed as the vessel revolves. The chamber 31, which is stationary, is shown as supplying the elastic fluid to only the five bottom sections, but the number may be varied as desired, so long as sufficient air or other elastic element is supplied. It is, of course, necessary that the elastic fluid be supplied only to the grate sections 27 when they are beneath the fuel bed.

In Figs. 6 and 7, I have shown a modification of the grate sections 27 which are illustrated in Figs. 4 and 5. This modification consists in forming the sections of L-shaped castings 27', having their forward ends 33 closed and their rear ends provided with openings 29' therein. Apertures 28', through which the elastic fluid is admitted into the interior of the vessel, are provided by making one edge of the section saw-toothed. The sections are so arranged that the air is blown out through the apertures 28' in a direction opposite to the direction of rotation of the vessel.

The terms and expressions which I have employed are used as terms of description and not of limitation, and I have no intention, in the use of such terms and expressions, of excluding any equivalents of the features shown and described, or portions thereof, but recognize that various modifications are possible within the scope of the invention claimed.

What I claim is:

1. In apparatus for gasifying materials, a rotary vessel having an intake and an offtake for the material and having a plurality of compartments arranged around its periphery in blocks made of fire resisting material, said compartments being connected with a source of supply for an oxygen bearing agent and having also openings therefrom to admit the oxygen bearing agent into the vessel, and automatic means for cutting off and admitting the oxygen bearing agent into each of said compartments with each revolution of the vessel.

2. In apparatus for gasifying materials, a rotary vessel having an intake and offtake for the material, the offtake being arranged on the horizontal longitudinal axis of the vessel, one portion of the vessel being of greater cross section than the cross section of the remainder of the vessel and being adapted to maintain therein a fuel bed at least twice as deep as that maintained in the remainder of the vessel, and means for admitting an oxygen bearing agent through the walls of such enlarged portion of the vessel at points in such fuel bed.

3. In apparatus for gasifying materials, a rotary vessel having an intake and an offtake for the material and having a plurality of hollow blocks in the lining of the vessel, having openings into the interior of the vessel and being connected with an air supply and means for cutting off the supply of air from the hollow blocks occupying the position above the material with each revolution of the vessel.

ERNEST L. BROOME.